United States Patent
Gaitas et al.

(10) Patent No.: US 8,156,568 B2
(45) Date of Patent: Apr. 10, 2012

(54) HYBRID CONTACT MODE SCANNING CANTILEVER SYSTEM

(75) Inventors: Angelo Gaitas, Ann Arbor, MI (US); Yogesh B. Gianchandani, Ann Arbor, MI (US)

(73) Assignee: Picocal, Inc., Ann Arbor, MI (US)

( * ) Notice: Subject to any disclaimer, the term of this patent is extended or adjusted under 35 U.S.C. 154(b) by 644 days.

(21) Appl. No.: 12/104,396

(22) Filed: Apr. 16, 2008

(65) Prior Publication Data
US 2008/0266575 A1  Oct. 30, 2008

Related U.S. Application Data

(60) Provisional application No. 60/926,422, filed on Apr. 27, 2007.

(51) Int. Cl.
*G01B 11/30* (2006.01)

(52) U.S. Cl. ....... 850/6; 850/1; 850/5; 850/63; 250/307; 73/105; 977/852; 977/863

(58) Field of Classification Search .......... 850/1, 5, 850/6, 63; 250/307; 73/105; 977/852, 863
See application file for complete search history.

(56) References Cited

U.S. PATENT DOCUMENTS

| | | | |
|---|---|---|---|
| 5,267,471 A | | 12/1993 | Abraham et al. |
| 5,298,975 A | * | 3/1994 | Khoury et al. ............... 356/624 |
| 5,394,741 A | * | 3/1995 | Kajimura et al. ............ 73/105 |
| 5,398,113 A | | 3/1995 | de Groot |
| 5,406,832 A | | 4/1995 | Gamble et al. |
| 5,581,082 A | | 12/1996 | Hansma et al. |
| 5,616,916 A | * | 4/1997 | Handa et al. ................. 250/234 |
| 5,705,814 A | * | 1/1998 | Young et al. ................... 850/2 |
| 5,825,020 A | * | 10/1998 | Hansma et al. .............. 250/216 |
| 5,994,691 A | | 11/1999 | Konada |
| 6,005,251 A | | 12/1999 | Alexander et al. |
| 6,032,518 A | * | 3/2000 | Prater et al. ................... 73/105 |
| 6,144,028 A | | 11/2000 | Kley |
| 6,189,373 B1 | | 2/2001 | Ray |
| 6,201,401 B1 | | 3/2001 | Hellemans et al. |
| 6,229,138 B1 | | 5/2001 | Kley |
| 6,232,597 B1 | | 5/2001 | Kley |
| 6,242,734 B1 | | 6/2001 | Kley |
| 6,281,491 B1 | | 8/2001 | Kley |
| 6,310,342 B1 | | 10/2001 | Braunstein et al. |
| 6,339,217 B1 | | 1/2002 | Kley |
| 6,357,285 B1 | | 3/2002 | Allen |
| 6,369,379 B1 | | 4/2002 | Kley |
| 6,396,054 B1 | | 5/2002 | Kley |
| 6,455,838 B2 | * | 9/2002 | Schaffer et al. ............. 250/216 |
| 6,466,309 B1 | | 10/2002 | Kossakovski et al. |
| 6,485,413 B1 | | 11/2002 | Boppart et al. |
| 6,489,611 B1 | | 12/2002 | Aumond et al. |

(Continued)

*Primary Examiner* — Phillip A Johnston
*Assistant Examiner* — Michael Logie
(74) *Attorney, Agent, or Firm* — Jelic Patent Services, LLC; Stanley E. Jelic

(57) ABSTRACT

This invention addresses a contact mode hybrid scanning system (HSS), which can be used for measuring topography. The system consists of a cantilever or a cantilever array, a scanning stage, a light source, and instrumentation to synchronize and control the individual components. Detection of the cantilever's movement is achieved by directly measuring the change in disposition of the cantilever including its height, rotation at one or more points on the cantilever thereby providing a partial three-dimensional reconstruction without the need for actuating the cantilever. This is achieved by employing a displacement meter such as a triangulation meter or a confocal meter.

11 Claims, 11 Drawing Sheets

U.S. PATENT DOCUMENTS

| | | |
|---|---|---|
| 6,507,309 B2 | 1/2003 | McMakin et al. |
| 6,515,277 B1 | 2/2003 | Kley |
| 6,661,004 B2 | 12/2003 | Aumond et al. |
| 6,703,964 B2 | 3/2004 | McMakin et al. |
| 6,708,556 B1 * | 3/2004 | Kim et al. .................... 73/105 |
| 6,734,438 B1 | 5/2004 | Lindsay et al. |
| 6,945,099 B1 * | 9/2005 | Su et al. ...................... 73/105 |
| 7,091,476 B2 | 8/2006 | Kley |
| 7,098,678 B2 | 8/2006 | Altmann et al. |
| 7,151,598 B2 | 12/2006 | Poponin |
| 7,170,048 B2 | 1/2007 | Kakemizu |
| 7,198,961 B2 | 4/2007 | Li et al. |
| 7,514,679 B2 * | 4/2009 | Shin et al. .................. 250/306 |
| 7,556,968 B2 * | 7/2009 | Ando et al. .................. 436/165 |
| 7,562,564 B2 * | 7/2009 | Baba et al. .................... 73/105 |
| 7,644,447 B2 * | 1/2010 | Park et al. ...................... 850/1 |
| 7,692,138 B1 * | 4/2010 | Ray et al. .................... 250/234 |
| 7,784,107 B2 * | 8/2010 | Kley ............................... 850/4 |
| 2001/0038072 A1 * | 11/2001 | Aumond et al. ............ 250/307 |
| 2001/0052257 A1 | 12/2001 | Magerle |
| 2002/0113210 A1 | 8/2002 | Treado et al. |
| 2003/0233870 A1 * | 12/2003 | Mancevski .................... 73/105 |
| 2004/0020279 A1 | 2/2004 | Degertekin et al. |
| 2004/0159789 A1 | 8/2004 | Treado et al. |
| 2005/0194534 A1 | 9/2005 | Kneedler et al. |
| 2005/0221577 A1 | 10/2005 | Li et al. |
| 2005/0269495 A1 | 12/2005 | Kakemizu |
| 2006/0164640 A1 | 7/2006 | Treado et al. |
| 2006/0192956 A1 | 8/2006 | Treado et al. |
| 2007/0200559 A1 | 8/2007 | Proksch et al. |
| 2008/0135750 A1 * | 6/2008 | Kley ............................ 250/306 |
| 2008/0223117 A1 * | 9/2008 | Watanabe et al. .............. 73/105 |

\* cited by examiner

HYBRID CONTACT MODE SCANNING CANTILEVER SYSTEM

CROSS REFERENCE TO RELATED APPLICATIONS

This application claims priority from U.S. Provisional Patent Application Ser. No 60/926,422, entitled "High throughput scanning probe apparatus and method", filed on Apr. 27, 2007.

SEQUENCE LISTING OR PROGRAM

Not Applicable

FEDERALLY SPONSORED RESEARCH

TECHNICAL FIELD OF THE INVENTION

The present invention relates to a hybrid scanning system that utilizes techniques for cantilever movement detection that directly measure the change in disposition of the cantilever including the tip height, tip rotation at one or more points on the cantilever thereby providing a partial three dimensional reconstruction without the need for actuating the cantilever. This invention covers the use of displacement meters such as confocal and triangulation displacement meters to detect the out-of-plane (vertical) and lateral movements of a cantilever or cantilever arrays in order to produce a topographical and friction/surface roughness map of a specimen in contact with a cantilever equipped with a sharp tip. This invention also covers multiple light beams on a cantilever for the reconstruction of the cantilever's disposition. Finally, this invention covers the usage of these techniques for indentation measurements. This system may be used with specialized cantilevers to measure a number of additional properties such as thermal properties.

BACKGROUND OF THE INVENTION

The object of the present patent is to describe a method for improving the spatial resolution of displacement meters including laser confocal and triangulation displacement meters by using a cantilever to detect topographical variations, without feedback control of the cantilever position. The terms triangulation meter instead of triangulation displacement meter and confocal meter instead of confocal displacement meter may be used interchangeably. Topographical variations are measured by directly determining the change in disposition of the cantilever to provide a three dimensional topographical reconstruction. Triangulation displacement meters, or alternatively, confocal displacement meters are used to measure the vertical (out-of-plane) movement of the cantilever from the light reflected off the cantilever, and correlate it to the horizontal movement of the cantilever on the sample.

Laser confocal and triangulation displacement meters for measuring topographic variations have matured enough to allow nanometer resolution in the vertical (out-of-plane) direction. Laser confocal displacement meters have been described in literature and are commercially available. Both types of instruments find applications in a number of areas including thickness measurements, alignment, topography measurements, step height measurements, flatness measurements, profile measurements etc. However, these techniques provide inadequate spatial resolution for many applications due to the laser beam diameter, which is typically larger than 2 µm and often about 20 µm.

Scanning probe methods developed within the last two decades offer high-resolution images of sample properties. Scanning probe microscopes (SPM) measure properties at localized spots, such as: topography, thermal conductance, temperature, capacitance, optical absorption, or magnetism. They all use a cantilever with a sharp tip at a very close proximity or in contact with the sample. This close proximity allows for very high resolution. The image is formed by scanning a cantilever over the sample while measuring the desired property. Unlike light based microscopes such as laser confocal and laser triangulation displacement meters, scanning probe microscopes are not wavelength limited; hence their resolution is limited only by the size of the tip at the edge of a cantilever and not by the diffraction effects of light.

The atomic force microscope (AFM) is one of many types of SPM. AFM's employ: a cantilever, a light source, an electronic feedback circuit controlling the out-of-plane (vertical) position of the cantilever, an X-Y-Z piezoelectric transducer, and a photodetector. As the cantilever moves horizontally relative to the sample, topographical variations of the sample change the light reflected off the cantilever. A four-quadrant detector measures the reflection. A closed loop piezoelectric feedback control controls the vertical position of the cantilever. The feedback of the AFM counteracts the signal produced by the four quadrants detector. The cantilever or the sample is moved to maintain the cantilever and the light reflected from it at a constant angle. In almost all SPM's, cantilever positioning is achieved with piezoelectric transducers such as cylindrical piezotubes. Applying a voltage between electrodes of the piezotube causes the length of the tube to change with a limited maximum motion along the tube axis depending on the tube length.

A combination of confocal or triangulation displacement meters with a cantilever can operate without the need for closed loop piezoelectric feedback control. This type of arrangement would allow for improved spatial resolution of confocal or triangulation displacement meters without the additional complexity of an AFM. The cantilever can be easily added and separated from the displacement meter. Confocal and triangulation displacement meters have been used with a cantilever to produce topographical surface maps by the inventors.

Triangulation displacement systems have been widely used. Their use has also been reported in the semiconductor industry for a number of applications including: inspection, quality control, and defect detection of integrated circuits during various manufacturing stages, measuring the change in thickness of a wafer and other planarizing parameters in processes such as chemical-mechanical polishing, and inspection of chip packages.

Triangulation displacement meters measure the position of an object by tracking the light reflected from the target surface. A light beam, typically laser (including a superluminescent laser or diode), is projected on an object. Other light sources such as collimated light or room light may be used. The reflected beam is focused through a lens on a light-receiving element (photodetector) such as a position sensitive device (PSD) or charge coupled device (CCD). As the scan of the sample progresses, variations in the sample topography lead to variations in the position of the reflected signal as measured by the photodetector. A number of mathematical algorithms can be used to calculate the topography from the change in the signal on the photodetector and from the geometry of the set-up. When the term triangulation displacement meter or triangulation meter is used herein it refers to a system that uses any type of light source reflected on a photo-detector to track displacement changes.

Confocal meters have been used for a number of applications, including: surface characterization, measuring the position of micro objects, highly reflective surface measurements, MEMS devices evaluation, characterization of biological structures, and measurement of solder, gold, and stud bumps.

In a typical laser confocal displacement meter, a lens attached to a tuning fork focuses a laser beam on the surface of the sample. The tuning fork oscillates a lens rapidly in the vertical (out-of-plane) direction, focusing and defocusing the laser on the sample. The beam returned from sample is reflected by a half mirror and focused on a pinhole. A peak signal is formed on a receiving element when the focal plane coincides with the sample. A detector transforms the light signal to an electrical signal. Changes in surface reflectance do not affect the focal position and, therefore, the topography measurement.

SUMMARY OF THE INVENTION

The present invention addresses a hybrid scanning system (HSS). The HSS system consists of a cantilever or a cantilever array, a scanning stage, a light source, and instrumentation to synchronize and control the individual components. Detection of the cantilever or cantilever array movement is achieved by directly measuring the change in disposition of the cantilever including the cantilever height, cantilever rotation at one or more points on the cantilever thereby providing a partial three dimensional reconstruction without the need for actuating the cantilever or optomechanical feedback.

This has been achieved by employing a triangulation displacement meter to measure the out-of-plane (Z axis) movement of the cantilever from the captured reflected light, and correlates it to the in-plane (X-Y axis) movement of the cantilever at each point. Alternatively, the out-of-plane (Z axis) deflection can be measured with a confocal meter from the captured reflected light, and correlating it to the in-plane (X-Y axis) movement of the cantilever at each point. Devices with these improvements have numerous applications, including high throughput inspection, molecular measurements, microscopy and manipulation technology, lithographic manufacturing, nanometer scale surface profiling, and other aspects of nanotechnology.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
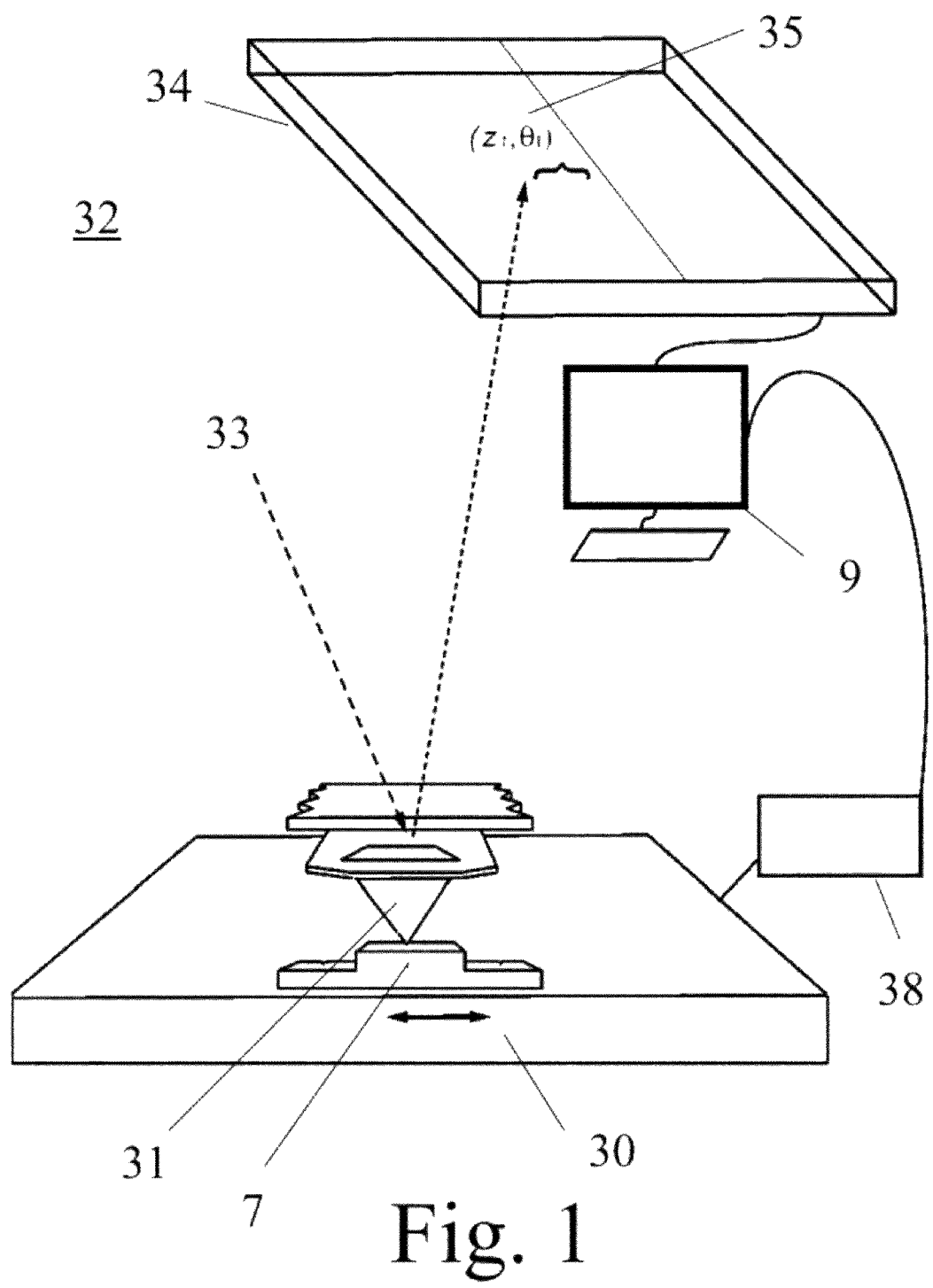
FIG. 1 shows how a triangulation displacement meter is employed to detect the out-of-plane (Z axis) deflection of a cantilever.

In the following are detailed descriptions of the invention of exemplary embodiments. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention.

The present invention provides with a method for detecting the out-of-plane (Z axis) movement of a cantilever or of an array of cantilevers without optomechanical feedback, by directly measuring the change in disposition of the cantilever including the cantilever height, cantilever rotation at one or more points on the cantilever thereby providing a partial three dimensional reconstruction without the need for actuating the cantilever. This has been achieved with a triangulation meter used to measure the out-of-plane (vertical Z axis) movement of the cantilever based on changes in the reflected light, and correlate it to the in plane (X-Y axis) movement of the cantilever at each point. The out-of-plane (Z axis) deflection of a cantilever can also be measured with a confocal meter and correlated to the in-plane (X-Y axis) movement of the cantilever at each point.

Experimental results (presented below) demonstrate that cantilevers with sharp tips can be used to improve the spatial resolution of confocal and triangulation systems. In both cases the minimum detectable feature size was smaller than the laser beam diameter. In addition, the hybrid confocal and triangulation meter have no inherent limitations in the scanning area range and any limitations are due to the scanning stage, in contrast with an SPM, which is limited by the piezoelectric tube (a conventional SPM can usually scan an 80 μm×80 μm area).

Confocal and triangulation meters do not provide information about the sample's properties unlike scanning probe techniques. Embedded sensing elements in a cantilever would permit simultaneous piezo-electric, piezo-resistive, thermal, mechanical, electrical or magnetic properties measurement, providing additional information about the sample. The cantilever may also be an electrostatic actuating cantilever, a magnetic actuating cantilever, a near-field scanning optical microscopy (NSOM) cantilever, or four cantilevers with four tips for sheet resistance measurements. These types of cantilevers may form an array of similar cantilevers. The hybrid systems presented here enable the use of such cantilevers allowing for additional characterization.

Hence, along with topographical information, thermal information can be obtained with an interface circuit to bias both the cantilever tip temperature and read the tip temperature via changes in cantilever resistance. A scanning thermal cantilever probe is well suited for measuring many heat-related parameters, including sample temperature, thermal conductance, heat capacity, glass transition temperature, subsurface mapping etc. Embedded sensing elements in/on a cantilever may be used for thermal imaging.

As the cantilever moves over a surface, changes in the chemical composition of the surface can give rise to torsions of the cantilever on which the cantilever is mounted. The torsion of the cantilever is then proportional to the friction between the cantilever's tip and the surface. The topographical image is derived from observing the normal forces and the lateral image by observing the torsional movements of the cantilever i.e. the twisting of the cantilever. Frictional force microscopy (FFM) has been used for nanometer inspections and industrial applications to optimize the etch conditions, to detect physical and chemical changes, and to characterize mechanical properties of thin films.

Displacement meters may be used for angular measurements in order to determine the twist of the cantilever. Angular changes are related to the lateral moment and therefore represent a map of the lateral forces on the cantilever due to surface roughness. Lateral measurements are enabled using a confocal meter by directing the laser beam at two locations of the cantilever and measuring the angular twist of the cantilever. This angle is related to the moment and therefore a map of the frictional force applied to the cantilever from scanning a specimen can be generated. Using triangulation methods the angle can be calculated by de-convoluting the photodetector's image into the out-of-plane (vertical Z axis) response and the lateral response. The cantilever's out-of-plane (Z axis) movement is represented on the photo-detector by a characteristic response such as a straight line. Any deviation from that characteristic response represents lateral movement, which can be calculated using trigonometry.

The SPM has been a very successful research tool, but emphasis has not been put on high throughput. Scan speeds of current SPM's are limited to about 180-250 μm/sec. Furthermore, piezoelectric transducers are designed to control a single cantilever. A combination of confocal or triangulation techniques with a cantilever (or an array of cantilevers) does not require closed loop piezoelectric feedback control allowing for higher throughput and large area scanning, enabling the simultaneous use of multiple cantilevers. Higher throughput is very important in many applications from biological to semiconductor failure analysis and production applications, where entire wafers or large areas need to be examined in relatively short time with sub-micron resolution. The results suggest that these unique detection systems can be used for high-resolution large area high throughput topographical imaging.

The need for higher throughput is addressed using an ultra compliant cantilever or cantilever array. In an array multiple cantilevers scan in parallel a sample with minimal contact force and without mechanical feedback. In this approach integrated piezo actuators are not required. An array of cantilevers refers to a collection of identically cantilever placed in series and joined by a common segment. An array may be a one dimensional array referring to an array possessing only one line of cantilevers or a two dimensional array referring to several lines of cantilevers in parallel forming a two dimensional array.

High-throughput contact mode topography along side with other types of imaging like thermal imaging can be performed with ultra compliant cantilevers or cantilever arrays. This method allows for highly scalable cantilever arrays to scan in parallel and it is possible for many of those arrays to operate simultaneously on a sample increasing analysis speeds. This technique requires minimal sample preparation.

It is preferred that the cantilevers be highly compliant, therefore the cantilever's body may comprise of one of many types of materials or a combination of materials such as photoresist, SU-8, and polymers such as poly(dimethylsiloxane) (PDMS), polyimide, parylene, and elastomers such as silicone and rubber. Cantilevers made from these laterials have low spring constants and therefore are highly compliant.

Topography or the measurement of out-of-plane (Z axis) deflection of each cantilever in an array is achieved by using a triangulation meter or by confocal meter. These techniques are fundamentally different than conventional SPM techniques. In the proposed set-up there is no need for Z axis actuation or Z axis feedback while scanning. The cantilever or cantilever array is scanned across a sample making measurements at discrete points. The X-Y stage controls the position of the sample. In the proposed set-up, the sample is moved in the X-Y direction while the cantilever and detection system are kept fixed. As the sample is moved, any height changes in the out-f-plane (vertical Z direction) will cause the light beam, reflected from the cantilever, to strike the detector at different locations.

Using one or two-dimensional array of cantilevers, multiple light sources may be directed at the cantilever array. The light source may be produced by the use of one or more diffractive optical elements, including diffraction gratings to form a plurality of light beams, each with a selectable shape and intensity, from a single light source and directed on each cantilever. Alternatively, a fiber coupled laser diode array and related focusing optics may be used. Instead of a laser, collimated light may be used. This is light whose rays are nearly parallel. In addition, ambient light (room light) may also be used. Finally, any other type of light source may be used. These light sources may be combined with a cantilever or cantilever array having a miniature mirror on the top side of each cantilever so. The reflected light from each single cantilever is detected by a photodector such as a CCD.

Alternatively, a scanning laser may be employed, in which case one light source scans each cantilever in an array of cantilevers.

In an alternative confocal embodiment a laser confocal meter is focused on the cantilever(s). In this invention a cantilever or an array of cantilevers with sharp tip(s) is scanned across a sample or alternatively it is kept fixed while the sample is being scanned. Any surface variations can be measured by focusing the laser beam of the displacement meter onto the cantilever and measuring the cantilever's deflection that corresponds to the changes in surface height. Multiple cantilevers may be monitored by scanning one laser beam on each cantilever or by a multiprobe confocal 3-D detection system.

A digital feedback may be used. With this capability the topography of the sample is imaged in the mode described, then, the cantilever is lifted above the surface (the height may be determined by using the laser scanning device to scan the sample and the cantilever and determine the cantilever's distance from the sample). The cantilever is then scanned across the sample following the exact shape of the topographical information collected during the scan. This type of measurement might be useful for example in magnetic force imaging to detect differences in magnetization, since magnetic (or electrostatic) forces act over longer distances than atomic forces.

In this system the sample is moved in the X-Y plane by the scanner relative to the cantilever and the photodetector, while the cantilever and the photodetector are kept at a fixed position. However, the cantilever and the photodetector may also be moved in the X-Y plane by the scanner relative to a sample, while a sample is kept at a fixed position.

The instrument is suitable for scanning biological samples. The free end portion of the cantilever may be configured to be submerged in a liquid or in another manifestation the flexible cantilever and the sample surface are all submerged in a fluid.

With the HSS technique, piezoscanners are no longer essential. Other types of scanners that do not have travel range compromises such as motorized scanners or voicecoil scanners etc. can be used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

Although this invention relates specifically to HSS measurements that use cantilever deflection as a measure of height changes, those skilled in the art will recognize that there are other physico-chemical properties that can be measured using substantially similar cantilevers, instrumentation, and algorithms. In addition, those skilled in the art will recognize that many scanning probe microscopy and atomic force microscopy techniques can be easily transferred and used with this system. Finally, those skilled in the art will recognize that cantilever-based instrument according to this invention; can be combined with an atomic force microscope, a scanning probe microscope, a confocal microscope, a scanning electron microscope, a conventional laser microscope or other types of metrology systems and analytical tools to provide additional functionality.

Referring to FIG. 1, a hybrid triangulation system is shown where triangulation meters are employed to detect the out-of-plane (Z axis) deflection of a cantilever. In the set-up, the sample 7 is moved in-plane (X-Y plane) by an X-Y micromanipulator 30 while the cantilever 31 and the detection system 32 are kept fixed. The cantilever 31 is brought in contact with the sample 7. As the sample 7 is moved, the light beam 33 is focused on the cantilever 31 and reflected from the cantilever 31 to be detected by the photodetector 34. Any height changes in the out-of-plane (vertical Z) direction of the sample cause the cantilever 31 to move in the out-of-plane (vertical Z) causing the light beam to strike the photodetector 34 at a different location 35. A of mapping algorithms can be used to calculate the height change from the change in the spot position on the photodetector 34 and the geometry of the set-up. The use of a cantilever 31 allows an in-plane (X-Y) resolution smaller than the laser beam's diameter because spatial resolution is a function of the cantilever's tip radius. The light beam might be a laser. A fiber coupled laser diode array and related focusing optics may be used to produce multiple beams for cases where cantilever arrays are used as in the case described in the figures below. However, collimated light may be used as well. In addition, ambient light (room light) may also be used. If white light is used such as ambient or collimated light, the cantilevers may have small mirrors (for instance mirrors made from a thin film of gold) to reflect light from only one point of the cantilever. The resolution of the out-of-plane (Z axis) deflection can be further increased by: a) placing a mirror or mirrors at predetermined distances and angles reflecting light reflected from the cantilever(s) onto the detector, b) increasing the distance the photodetector from the cantilever.

Figure 2:
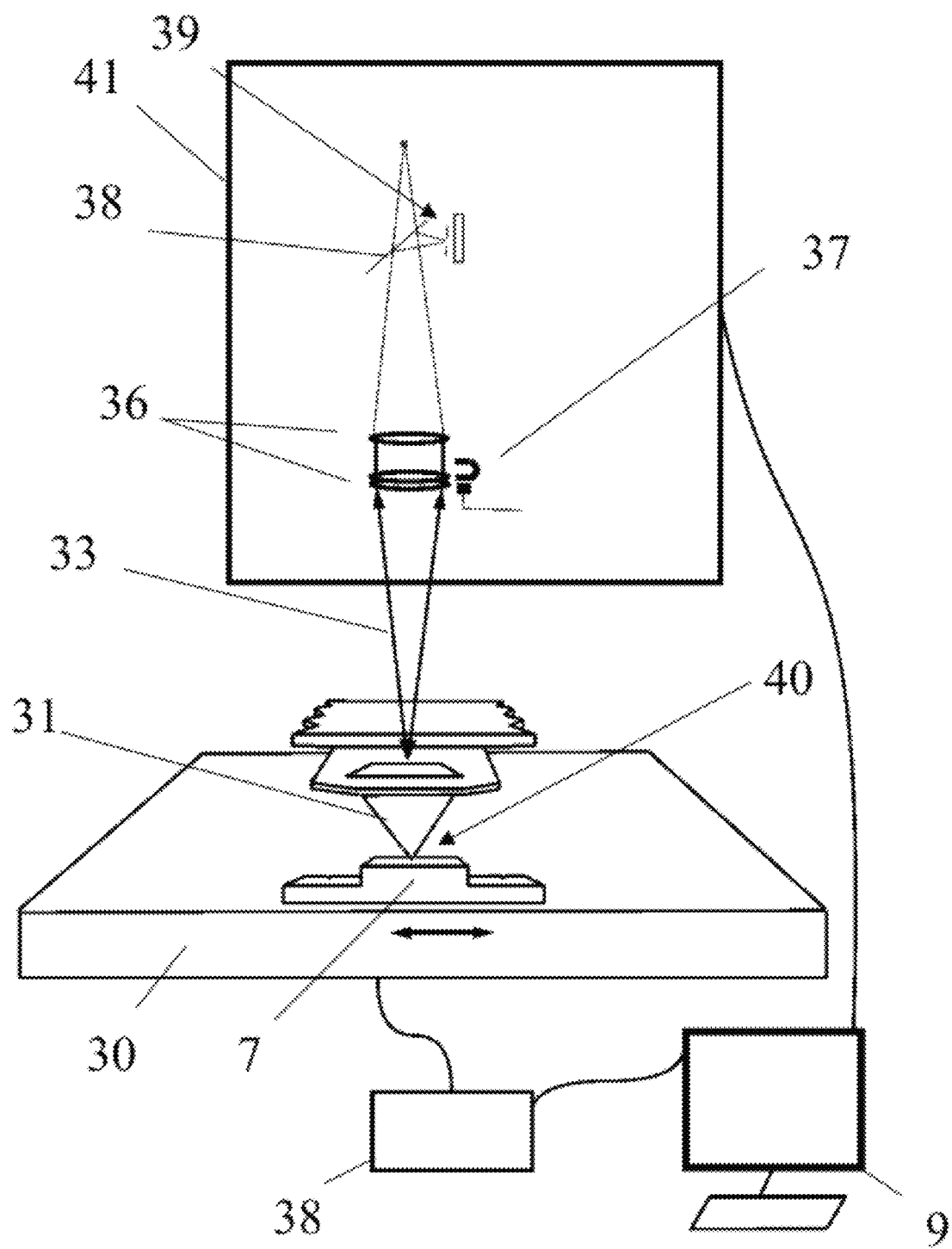
FIG. 2 shows how a confocal displacement meter is employed to detect the out-of-plane (Z axis) deflection of a cantilever.

Referring to FIG. 2, a confocal meter 41 can be used to measure the displacement of a cantilever 31. The laser beam 33 is focused on the cantilever 31 with a sharp tip 40 that is in contact with the sample 7. The beam 33 returned from cantilever 31 is reflected by a half mirror 38 and focused on a pinhole 39. The tuning fork 37 is used to modulate the focal position of the optical system. A peak signal is formed on a receiving element when the focal plane coincides with the sample 7. While the tuning fork 37 is oscillating, the focusing point moves accordingly. Hence, the variation of the position of the focusing point will be determined by the displacement of the lens 36. In this system a cantilever 31 is kept fixed while the sample 7 is being scanned. Any surface variations can be measured by focusing the laser beam 33 of the confocal displacement meter 41 onto the cantilever 31 and measuring the cantilever's deflection, which corresponds to the changes in surface height. This allows an in-plane (X-Y) resolution smaller than the laser beam's diameter. The in-plane (X-Y) resolution is a function of the tip's radius.

Referring to FIG. 3, a triangulation meter, the Keyence CCD Laser Displacement Sensor LK-G10, was used. This system offers a 10 nm resolution in the out-of-plane (Z axis) and has a laser spot of 20 µm. A piezo nanopositioning scanning stage by Physik Instrumente-PI (model P-517.3CL and E-710 controller) was used. The stage has a travel range of 100 µm×100 µm×20 µm and a closed loop resolution of 1 nm. Commercially available $Si_xN_y$ triangular cantilevers were used. The displacement meter and the stage were controlled using labview. A labview DAQ card was used to obtain the voltage signal from the displacement meter and the stage was controlled directly via a USB port.

Figure 3A:
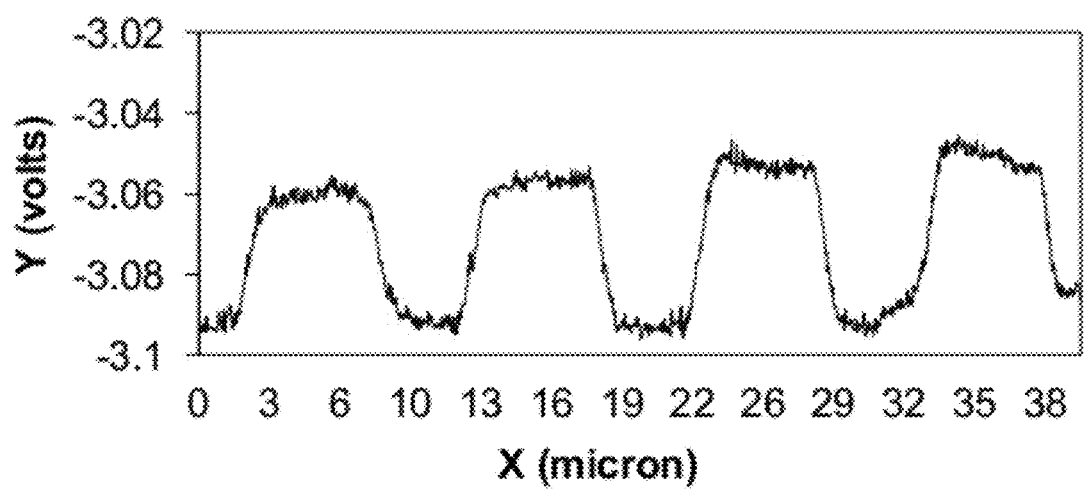
FIGS. 3a and 3b show scans of 5 micron×5 micron squares using a triangulation meter to detect the out-of-plane (Z axis) deflection of a cantilever.
Figure 3B:
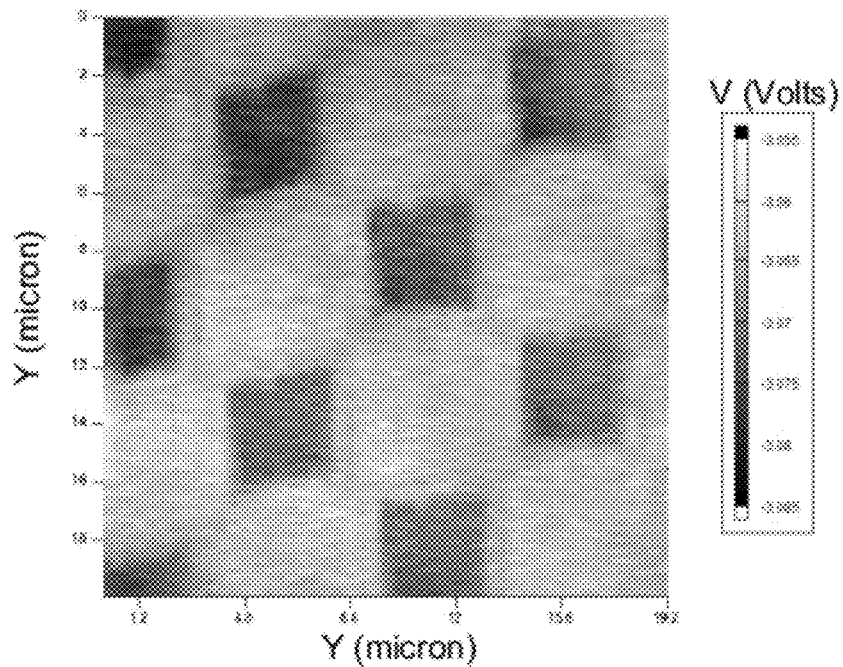

FIGS. 3a and 3b show scans of 5 micron×5 micron squares using a triangulation meter to detect the out-of-plane (Z axis) deflection of a cantilever. Using a cantilever with a sharp tip, features smaller than the laser beam 42, which is 20 micron, were clearly detectable. To obtain the scan in FIG. 3a, a triangular $Si_xN_y$ cantilever was used on a commercially available grating that included a 10 µm pitch with ~5 m×5 µm×0.9 µm features. FIG. 3a shows a 40 µm line, 1000 points were acquired in the X direction at 10 µm/sec speed. In FIG. 3a the four 5 µm squares separated 5 µm gaps are clearly visible. Note that the laser beam's diameter is 20 µm and thus this scan is not possible by using the displacement meter directly on the sample. A number of successful three dimensional scans were obtained using the same grating sample and a cantilever. FIG. 3b demonstrates a scan of a 20 µm×20 µm area of the same grating where the 5 µm×5 µm squares 42 are clearly visible. A measurement was made every 100 nm in the X direction while the sample was moved every 400 nm in the Y direction, the scanning stage moved at a speed of 10 µm sec.

Figure 4A:
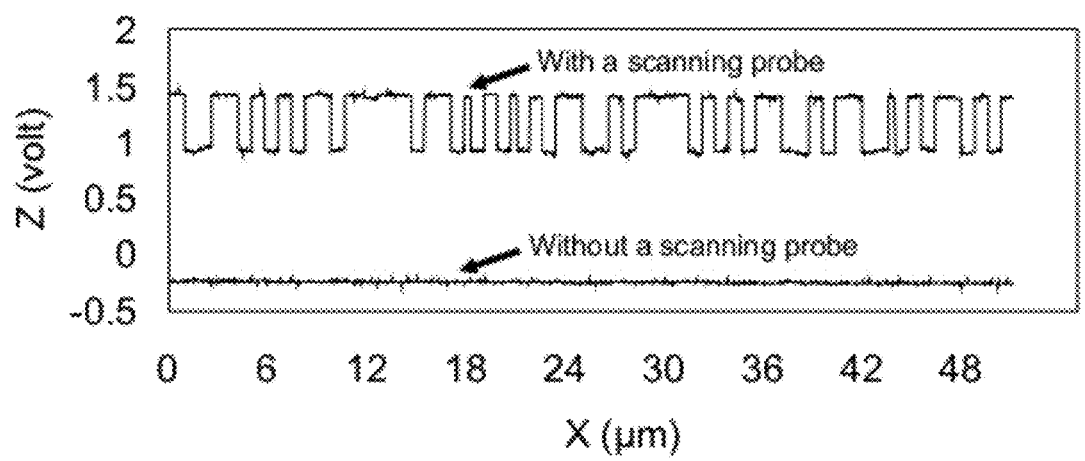
FIGS. 4a and 4b show images obtained with a hybrid confocal meter with a cantilever.
Figure 4B:
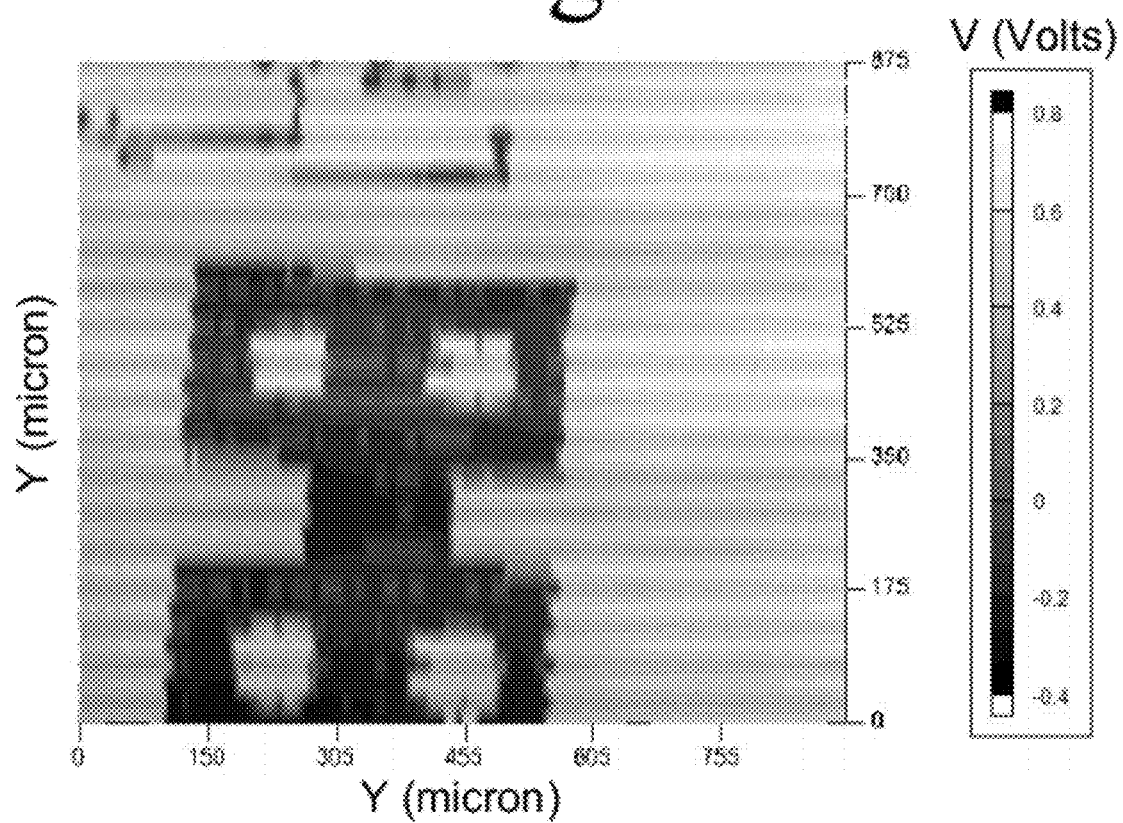

Referring to FIGS. 4a and 4b, a hybrid confocal meter from Keyence, LT-9010, was used. This meter provides a minimum 10 nm resolution in the Z direction, with a laser spot diameter of 2 µm. A National Instruments DAQ card was used to interface the confocal meter with a laptop. The analog signal from the confocal meter was accessed through the DAQ card. An inexpensive KT-LS80-M T-LS Series Motorized Linear Stage from Zaber was used for these experiments. The stage offered an accuracy of 12 µm, a repeatability of 0.4 um, and a backlash of 12 µm. The stage was connected via a USB port to a laptop and Labview was used to control the stage. In FIG. 4a, 2 µm lines can clearly be seen in this line scan of 50 µm, which contains 2 µm lines each spaced at 2 µm. These results are repeatable and consistent and show better than 1µm resolution. It is hypothesized that the lines appear wider or narrower depending on the frictional forces acting on the cantilever at different locations. When the confocal meter's laser was scanned directly on the sample, without a cantilever, only noise was observed as shown in the bottom line of FIG. 4a. In FIG. 4b a large area scan is shown. The sample 7 contained a number of features on a glass wafer 43 made from a thin 100 nm layer of gold. The area scanned was 900 µm×900 µm. 180 data points were obtained in the X direction, while the sample was moved at 25 µm steps in the Y direction. The scanning speed was 100 µm/sec.

Figure 5:
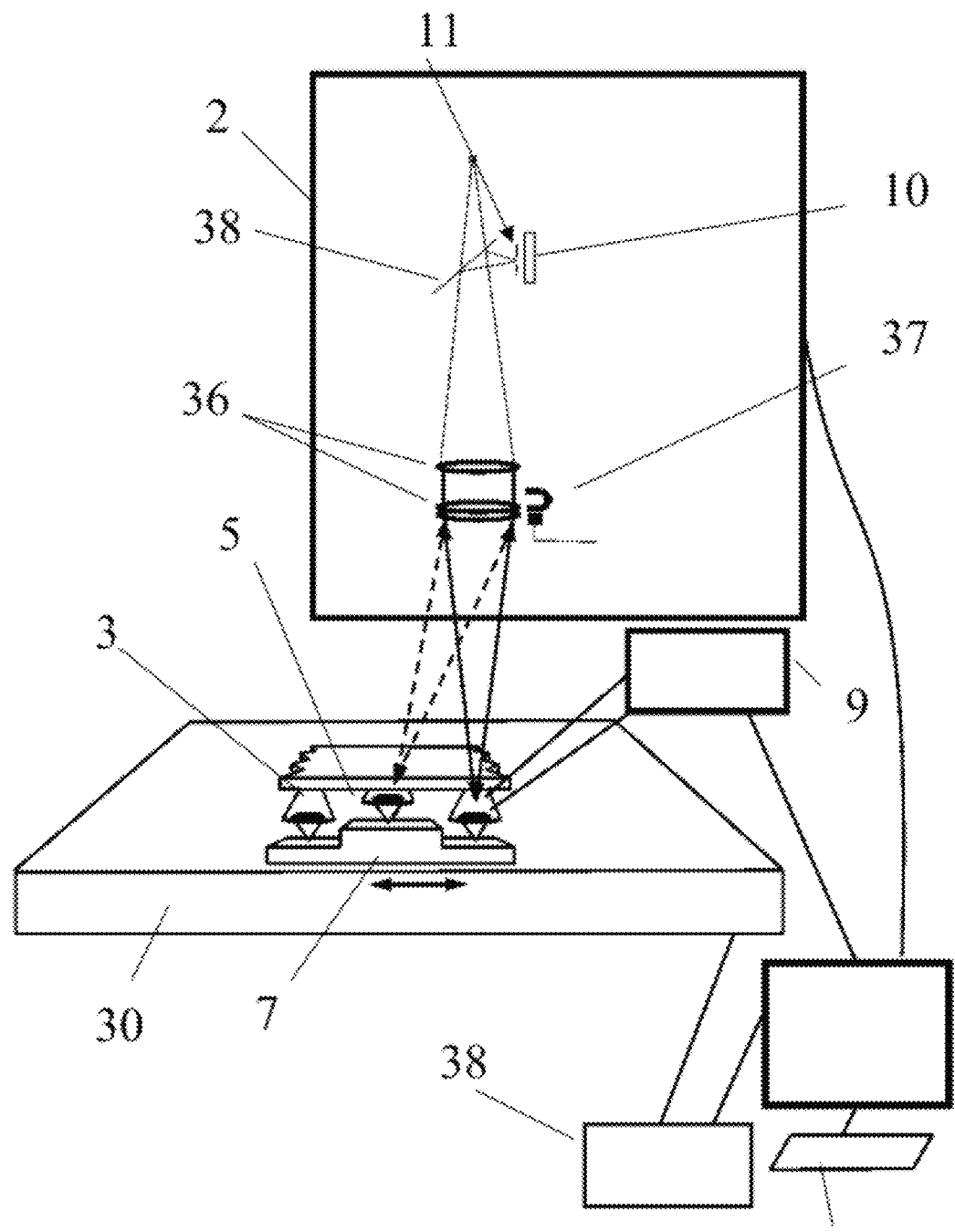
FIG. 5 shows a system, which employs a confocal laser to detect the out-of-plane (Z axis) deflection of a cantilever array.

FIG. 5 shows a system 1 which employs a confocal meter 2 to detect the out-of-plane (Z axis) deflection of the cantilever 3. In this particular embodiment a confocal meter 4 is focused on the cantilever(s) 5. The confocal meter can be programmed by a computer interface 8 to monitor the height changed of a number of cantilevers 5 in a specified area. The X-Y resolution is tip dependent (a function of the tip's radius). This system can function independently, but it can also be combined with a thermal probe cantilever and a circuit interface 9 for simultaneous thermal imaging. The cantilever-array may be made of an ultracompliant material such as a polymer, minimizing sample damage. The basic principle of its operation is the scanning one or more focused beams of light on a cantilever. The point of illumination is brought to focus in the cantilever 3 by the objective lens 9, and in-plane (laterally) scanned using some form of scanning device under computer control 8. The sequences of points of light from the cantilever 3 are detected by a photodetector 10 through a pinhole 11 and the output from the photodetector 10 is built into an image and displayed by the computer 8. The photodetector device 10 can be a photon multiply tube or charge-coupled device (CCD) or photodiode configured to detect a light beam reflected from the cantilever 5.

Figure 6:
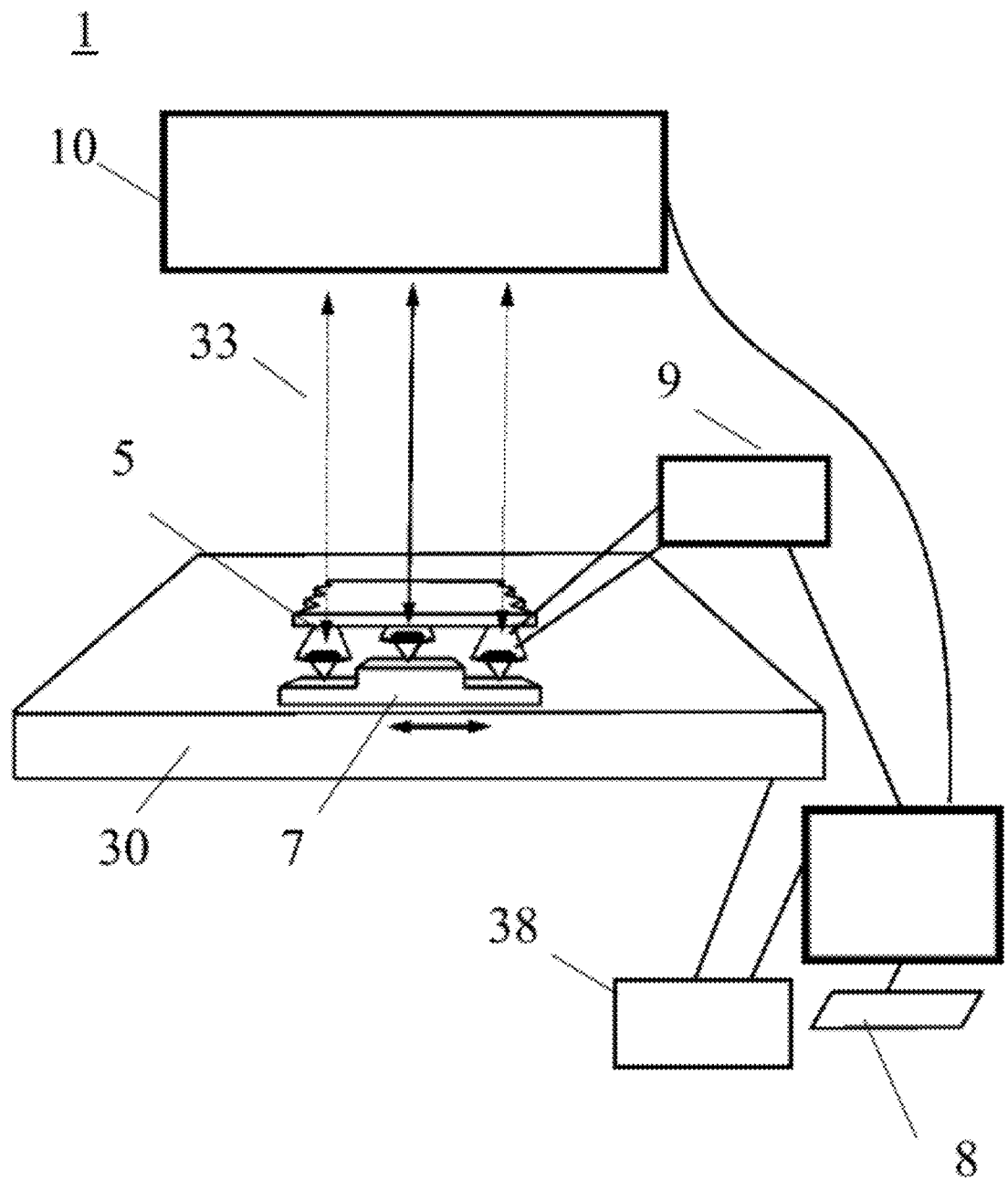
FIG. 6 shows a system, which employs a confocal meter to detect the out-of-plane (Z axis) deflection of a cantilever array.

FIG. 6 shows a system 1 which employs a confocal meter to detect the out-of-plane (Z axis) deflection of a cantilever array. Multiple laser beams scan each cantilever 5. The cantilever's deflection, which is translated into topographical changes, is detected by the photodetector 10. Localized thermal mapping may also be provided simultaneously if thermal cantilevers and a circuit interface 9 are used.

Figure 7:
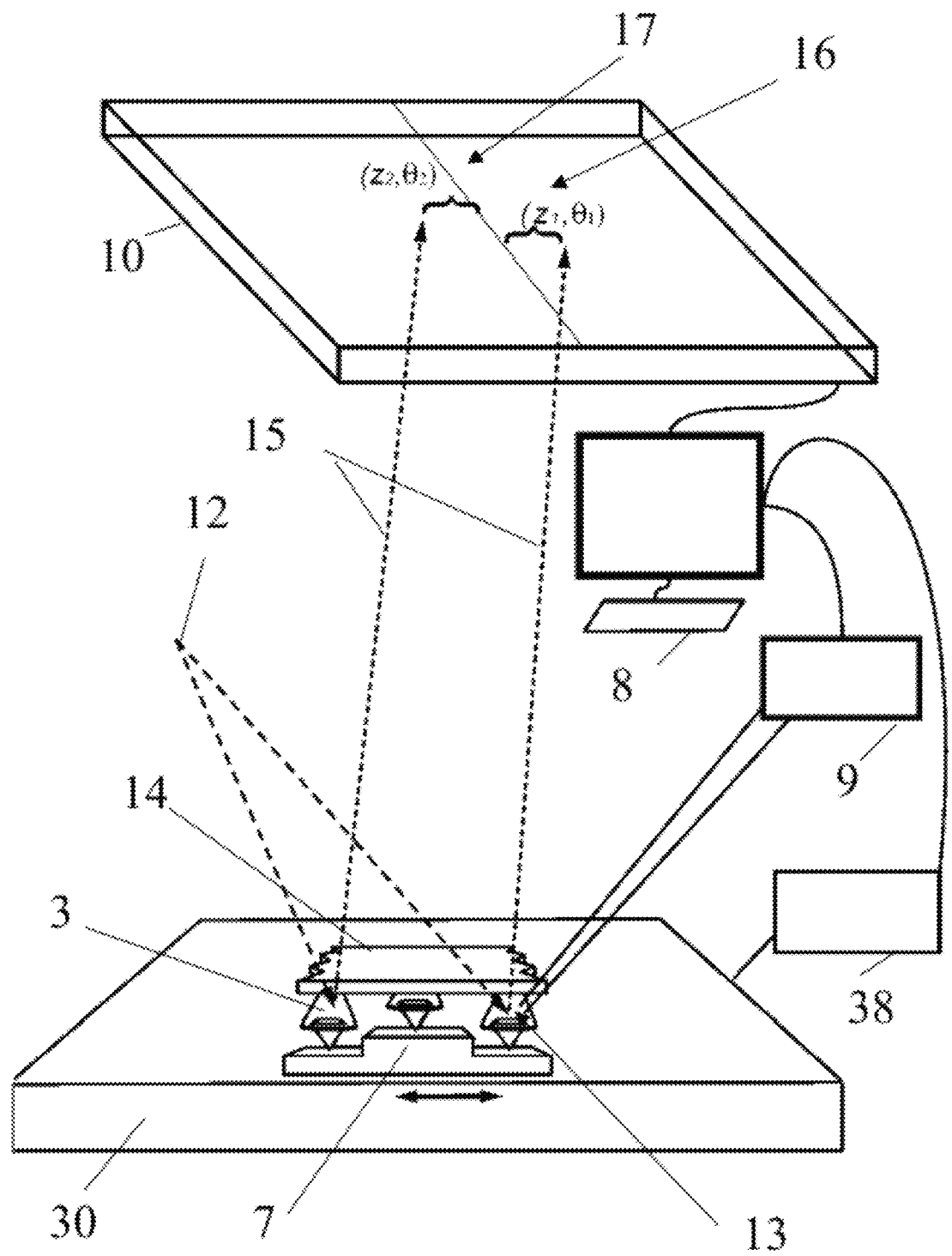
FIG. 7 shows a system in which a triangulation meter is employed to detect the out-of-plane plane (Z axis) deflection of a cantilever array.

FIG. 7 Triangulation meters may be used to detect out-of-plane (Z axis) movement. A beam 12 reflects on the mirror 13 at the back of the cantilever 3. The beam 12 passes through an optical magnifying lenses 14 and is detected by a photodetector 10. In one set-up the sample 7 is moved in the X-Y direction while the cantilever 3, light-source 12, and photodetector 10 are kept fixed. As the sample 7 is moved, any height changes in the out-of-plane (vertical Z direction) will cause the light beam 12, reflected from the cantilever's mirror 13, to strike the photodetector 14 at a different location. The image of the reflection 15 is then captured by a detector 14 and analyzed. Knowing the change in the distance between two points 16 and 17 on the detector 14 the surface height changes of the measured object can be determined using a triangulation meter. Localized thermal mapping may also be provided simultaneously if thermal cantilevers and a circuit interface 9 are used.

Figure 8:
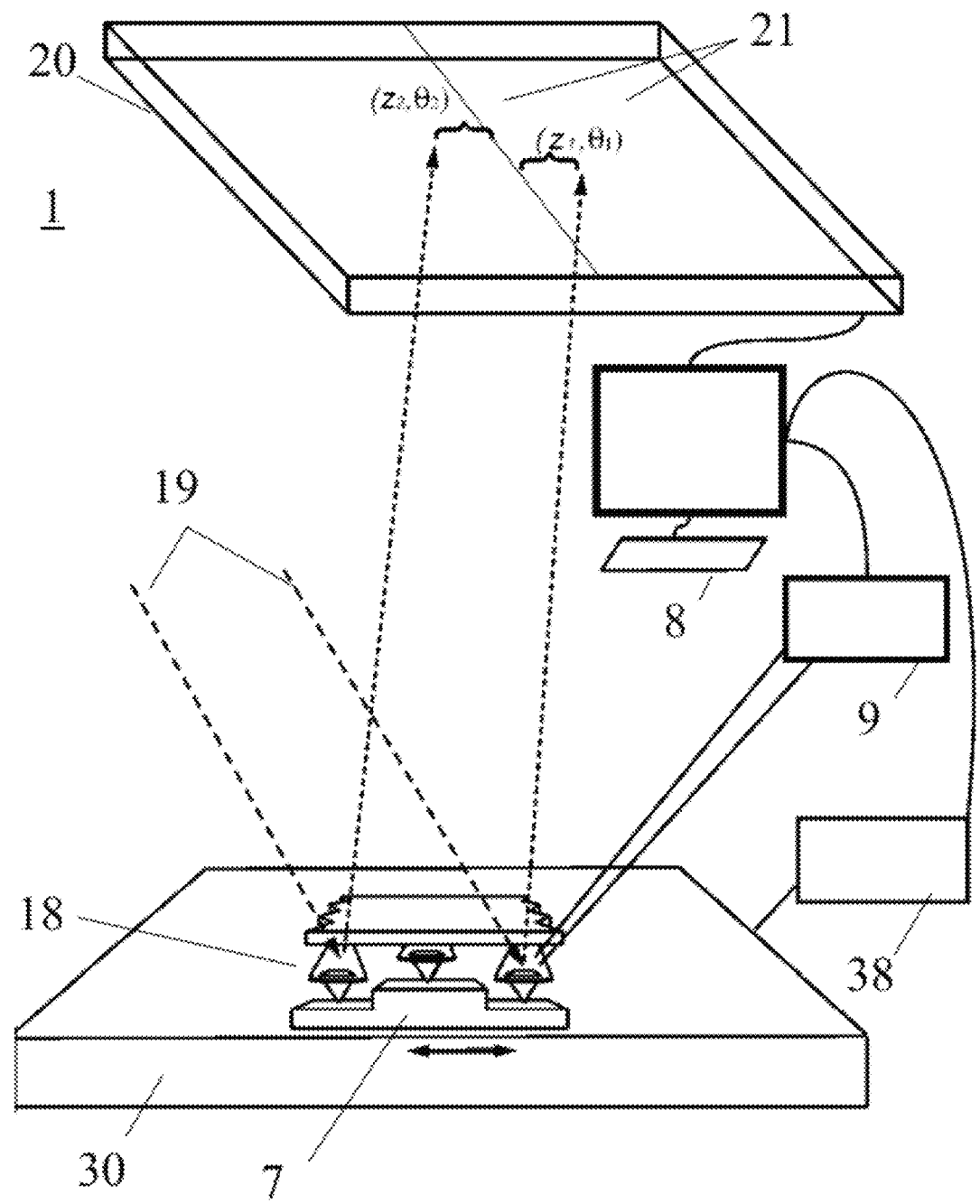
FIG. 8 shows a system in which triangulation meter is employed to detect the out-of-plane (Z axis) deflection of a cantilever array.

FIG. 8 shows a system 1 in which a triangulation meter 20 is employed to detect the out-of-plane (Z axis) deflection of a cantilever array 18. Multiple laser beams 19 scan each cantilever of an array 18 and output their deflection 21. Localized thermal mapping may also be provided simultaneously if thermal cantilevers and a circuit interface 9 are used.

Figure 9A:
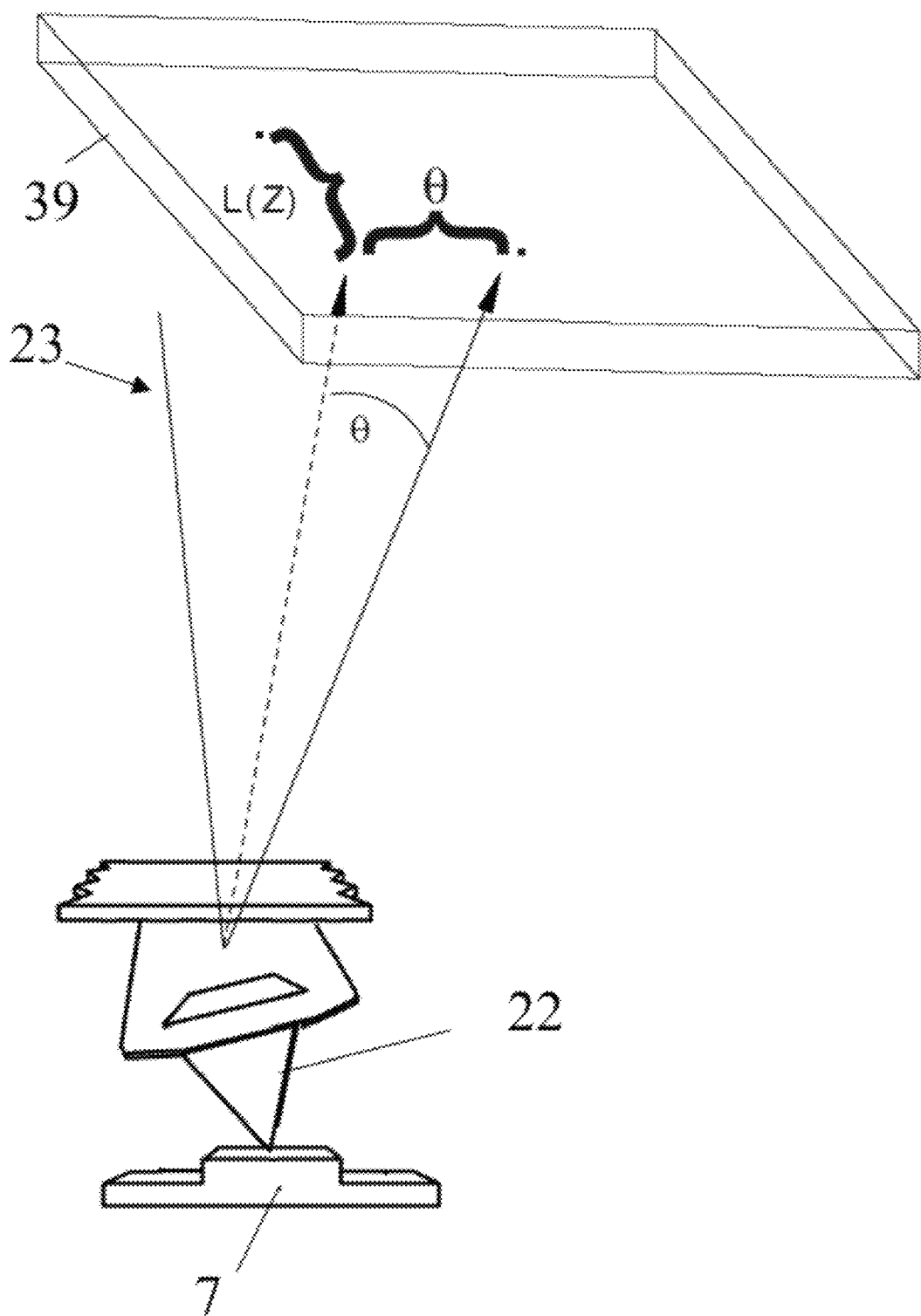
FIG. 9a illustrates angular measurement in order to determine twist of the cantilever using a confocal meter.

FIG. 9a illustrates an angular measurement in order to determine twist of the cantilever 22 using a confocal meter 39. A laser confocal displacement meter (confocal meter) 39 can directly measure the angle of twist of the cantilever 22 by scanning the laser beam 23 at two locations on the cantilever 22. This angle is related to the moment and therefore a map of the frictional force applied to the cantilever 22 from scanning a specimen 7 can be generated.

Figure 9B:
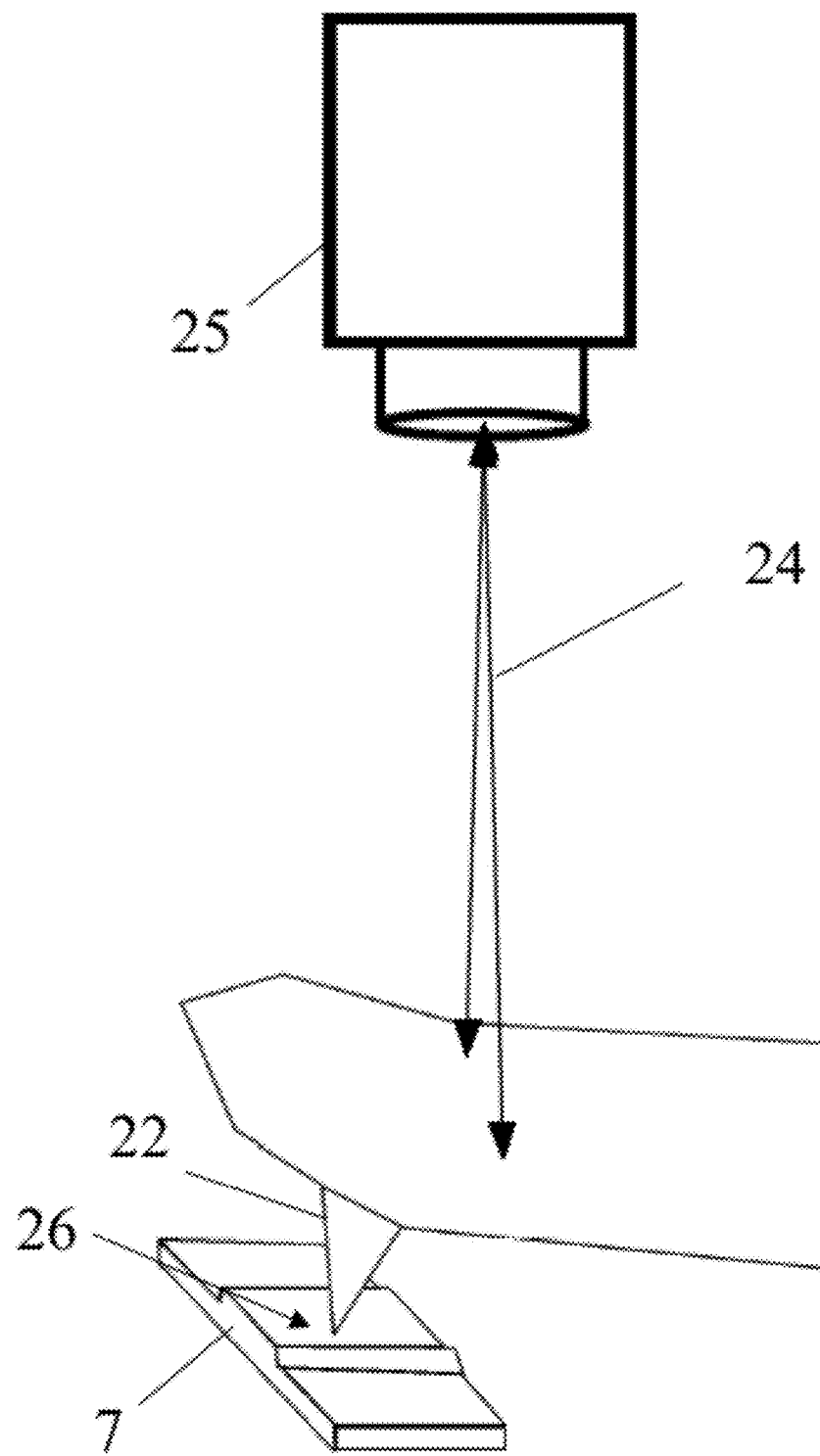
FIG. 9b illustrates angular measurement in order to determine twist of the cantilever using a triangulation meter.

FIG. 9b illustrates an angular measurement in order to determine twist of the cantilever 22 using a triangulation meter. Using a triangulation meter the angle of twist of a cantilever can be measured by monitoring the signal location 24 on the detector 25 which depends on the out-of-plane (Z axis) movement of the cantilever 22 and the interfacial friction force between tip 26 and sample 7. The cantilever's out-of-plane (Z axis) movement is represented on the photodetector 25 by a characteristic response such as a straight line. Any deviation from that line represents lateral movement, which can be calculated using trigonometry.

Figure 10:
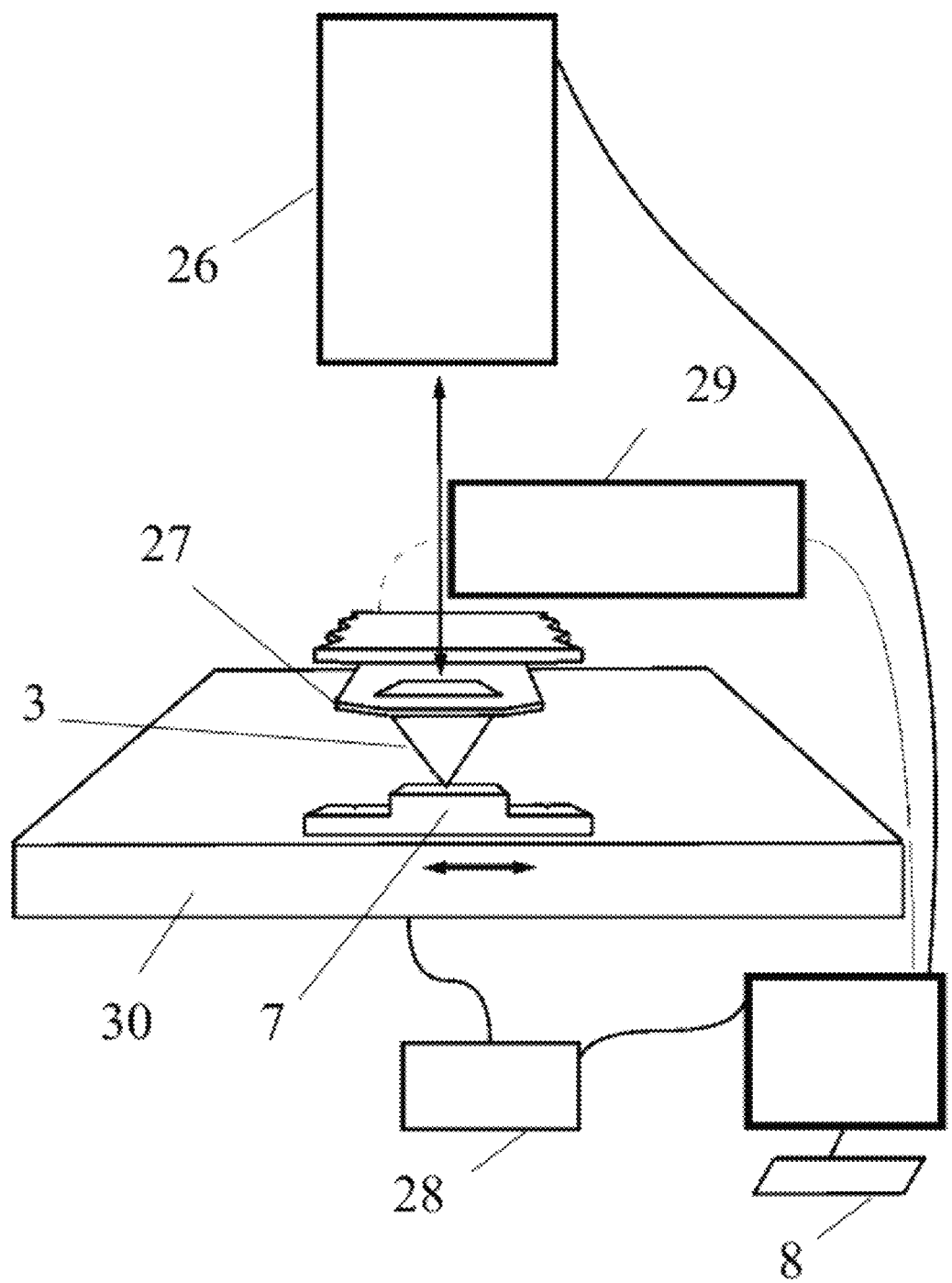
FIG. 10 illustrates a set-up where nanoindentation is enabled.

Now referring to FIG. 10, with the set-up described above, nanoindentation is also enabled. A cantilever with a sharp tip 3 is used to make indentations applying and recording the load, while the displacement is measured with a displacement meter 26 such as a triangulation or a confocal meter. From the load displacement data, users obtain information about the mechanical properties of a sample 7. There are a number of transducer technologies for force actuation. These include: piezoelectric displacement actuator external to the cantilever, piezoelectric actuator on or in the cantilever, electromagnetic actuator, and electrostatic actuator etc. An optical microscope or a displacement meter 26 (as described above) may be used to determine the cantilever's 27 position. In this case, a scanning nanoindenter combines a displacement meter 26, a cantilever 27, an X-Y scanner 28, and a transducer 29 for force actuation and force measurement.

An image of the surface topography is generated using the techniques mentioned above. The cantilever tip is situated at a location of interest on the sample 7 and an indentation is made. Following the indentation, a topographical image can be made to verify the indentation's size and location. Furthermore, a cantilever array may be used, in which case, multiple transducers 29 for force actuation can be used on each cantilever 27 of the array, while the displacement is measured by the techniques described previously. Nanoindentation is used to determine the mechanical properties of materials. It may be used to map the spatial distribution of a cell's mechanical properties, reflecting the structure of the cytoskeleton of a cell.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention. Furthermore, other areas of art may benefit from this method and adjustments to the design are anticipated. Thus, the scope of the invention should be determined by the appended claims and their legal equivalents, rather than by the examples given.

The emodiments of the invention in which an exclusive property is claimed are defined as follows:

1. A method for generating a three dimensional profile of a scanned sample surface comprising:
 using a cantilever disposed on a first side of a free end and adapted to be brought into contact with a sample surface;
 generating relative scanning movement between the cantilever and the sample surface with an X-Y scanner;
 using a displacement meter, wherein said displacement meter is a triangulation displacement meter, comprising:
 a light source for illuminating the cantilever, an optical lens for focusing the reflected light onto a light sensitive element, and a light sensitive element;

calculating an algorithm which uses the angles formed from the incident and reflected light onto the cantilever along with the output of the displacement meter;

correlating the output of said algorithm to the out-of-plane (Z axis) movement of the cantilever; and correlating the out-of-plane (Z axis) movement of the cantilever to the in-plane (X-Y axis) position of the cantilever, wherein the correlation corresponds to the topography of the sample.

2. A method for generating a three dimensional profile of a surface comprising:

using a cantilever disposed on a first side of a free end and adapted to be brought into contact with a sample surface;

generating relative scanning movement between the cantilever and the sample surface with an X-Y scanner;

using a displacement meter, wherein said displacement meter is a confocal displacement meter, comprising: a light source for illuminating the cantilever, an objective lens, an aperture where the reflected light is concentrated, a light detection element, and means of measuring the change in the position of one or more parts of said confocal displacement meter;

calculating an algorithm which uses the angles formed from the incident and reflected light onto the cantilever along with the output of the displacement meter;

correlating the output of said algorithm to the out-of-plane (Z axis) movement of the cantilever; and correlating the out-of-plane (Z axis) movement of the cantilever to the in-plane (X-Y axis) position of the cantilever, wherein the correlation corresponds to the topography of the sample.

3. The method of claim 1 or 2, wherein the cantilever is a cantilever array.

4. The method of claim 3, wherein multiple beams of light are directed at multiple cantilevers within the cantilever array.

5. The method of claim 3, wherein a light source scans each cantilever within the cantilever array.

6. The method of claim 3, wherein the cantilever array is a scanning probe microscope cantilever.

7. The method of claim 1 or 2, wherein the scanner moves the sample in the X-Y plane while the cantilever and the displacement meter are kept at a fixed position.

8. The method of claim 1 or 2, wherein a cantilever or a cantilever array is force actuated, applying and recording a force on a sample.

9. The method of claim 1 or 2, wherein the scanner moves together with the cantilever and the displacement meter, while the sample is kept at a fixed position.

10. An apparatus for generating a profile of a scanned sample surface, the apparatus comprising:

a cantilever disposed on a first side of a free end and adapted to be brought into contact with a sample surface;

an X-Y scanner for generating relative scanning movement between the cantilever and the sample surface; and a displacement meter, wherein said displacement meter is a triangulation displacement meter, comprising: a light source for illuminating the cantilever, an optical lens for focusing the reflected light onto a light sensitive element, and a light sensitive element;

wherein the angles formed from the incident and reflected light onto the cantilever along with the output of the displacement meter are used in an algorithm;

the output of said algorithm correlates to the out-of-plane (Z axis) movement of the cantilever; and the out-of-plane (Z axis) movement of the cantilever is correlated to the in-plane (X-Y axis) position of the cantilever, wherein the correlation corresponds to the topography of the sample.

11. An apparatus for generating a profile of a scanned sample surface, the apparatus comprising:

a cantilever disposed on a first side of a free end and adapted to be brought into contact with a sample surface;

an X-Y scanner for generating relative scanning movement between said the cantilever and the sample surface; and a displacement meter, wherein said displacement meter is a confocal displacement meter, comprising: a light source for illuminating the cantilever, an objective lens, an aperture where the reflected light is concentrated, a light detection element, and means of measuring the change in the position of one or more parts of said confocal displacement meter;

wherein the angles formed from the incident and reflected light onto the cantilever along with the output of the displacement meter are used in an algorithm;

the output of said algorithm correlates to the out-of-plane (Z axis) movement of the cantilever; and the out-of-plane (Z axis) movement of the cantilever is correlated to the in-plane (X-Y axis) position of the cantilever, wherein the correlation corresponds to the topography of the sample.

* * * * *